United States Patent
Kazama et al.

(10) Patent No.: US 10,767,768 B2
(45) Date of Patent: Sep. 8, 2020

(54) TRUNNION-TYPE BALL VALVE, VALVE SEAL STRUCTURE, AND VALVE PACKING

(71) Applicant: KITZ CORPORATION, Chiba-shi, Chiba (JP)

(72) Inventors: Masahiro Kazama, Nagano (JP); Masazumi Funato, Nagano (JP)

(73) Assignee: KITZ CORPORATION, Chiba (JP)

( * ) Notice: Subject to any disclaimer, the term of this patent is extended or adjusted under 35 U.S.C. 154(b) by 147 days.

(21) Appl. No.: 15/571,362

(22) PCT Filed: May 13, 2016

(86) PCT No.: PCT/JP2016/064313
§ 371 (c)(1),
(2) Date: Nov. 2, 2017

(87) PCT Pub. No.: WO2016/182066
PCT Pub. Date: Nov. 17, 2016

(65) Prior Publication Data
US 2019/0154161 A1    May 23, 2019

(30) Foreign Application Priority Data
May 13, 2015 (JP) .................... 2015-098436

(51) Int. Cl.
*F16K 5/06* (2006.01)
*F16K 5/20* (2006.01)
*F16K 27/06* (2006.01)

(52) U.S. Cl.
CPC .............. *F16K 5/0689* (2013.01); *F16K 5/06* (2013.01); *F16K 5/0605* (2013.01);
(Continued)

(58) Field of Classification Search
CPC ........ F16K 5/06; F16K 5/0663; F16K 5/0668; F16K 5/0673; F16K 5/0678;
(Continued)

(56) References Cited

U.S. PATENT DOCUMENTS 3,266,769 A * 8/1966 Shand .................... F16K 5/0673
251/172
4,067,542 A * 1/1978 Morrison ............... F16K 3/0227
251/174
(Continued)

FOREIGN PATENT DOCUMENTS

DE    9408439 U1 *  8/1994    ........... F16K 5/0678
JP    55-163373    12/1980
(Continued)

OTHER PUBLICATIONS

International Search Report dated Aug. 16, 2016 in International Application No. PCT/JP2016/064313.

*Primary Examiner* — Hailey K. Do
(74) *Attorney, Agent, or Firm* — Wenderoth, Lind & Ponack, L.L.P.

(57) ABSTRACT

A trunnion-type ball valve, a valve seal structure, and a valve packing in which, a seal surface pressure of a tip outer peripheral region is improved. A ball (3) provided inside a body (2) is rotatably provided via upper and lower stems (4 and 5) and is sealed with a ball seat (6). The trunnion-type ball valve has a packing attached between an outer periphery step part provided at a rear part of the ball seat and the body and a pressing mechanism by which the packing is pressed to a ball direction, and is provided with a contact surface to be contacted with a step part surface of the outer periphery step part on a tip outer diameter side of the packing and a space provided between the packing and the step part surface of the outer periphery step part on a tip inner diameter side of the packing.

14 Claims, 6 Drawing Sheets

(52) U.S. Cl.
CPC ............. *F16K 5/0678* (2013.01); *F16K 5/20* (2013.01); *F16K 5/201* (2013.01); *F16K 27/067* (2013.01); *F16K 5/0647* (2013.01)

(58) Field of Classification Search
CPC .......... F16K 5/0689; F16K 5/20; F16K 5/201; F16K 5/202; F16K 5/205; F16K 5/0271; F16K 5/0471; F16K 5/161; F16K 5/168; F16K 5/181; F16K 5/182; F16K 5/188; F16K 3/0227; F16K 3/20; F16K 3/207
See application file for complete search history.

(56) References Cited

U.S. PATENT DOCUMENTS

| | | | | |
|---|---|---|---|---|
| 4,258,900 | A | * | 3/1981 | Kindersley ........... F16K 5/0673 251/172 |
| 4,286,614 | A | * | 9/1981 | Kacal .................... F16K 5/0673 137/246.22 |
| 4,292,989 | A | | 10/1981 | Cazzaniga et al. |
| 5,803,464 | A | * | 9/1998 | Ueda ....................... F16J 15/30 277/528 |
| 2002/0185625 | A1 | * | 12/2002 | Gosling ................ F16K 5/0678 251/315.01 |

FOREIGN PATENT DOCUMENTS

| | | |
|---|---|---|
| JP | 2002-257246 | 9/2002 |
| JP | 2011-122603 | 6/2011 |

\* cited by examiner

TRUNNION-TYPE BALL VALVE, VALVE SEAL STRUCTURE, AND VALVE PACKING

TECHNICAL FIELD

The present invention relates to, in particular, a trunnion-type ball valve, valve seal structure, and valve packing in a structure suitable for high pressures and high temperatures.

BACKGROUND ART

Conventionally, as valves for use under high-pressure or high-temperature environments, for example, trunnion-type ball valves have been known. In this valve, normally, a seat as a valve seat is attached to a valve body, and this seat is provided so as to be resiliently pressed and pushed onto the ball valve body by a resilient force of a spring attached to a gap of the body via a retainer gland, thereby allowing sealing by the seat on the upstream side against a fluid.

In this case, to improve sealability between the seat and the valve body, a packing material is attached therebetween. As a packing for high-pressure and high-temperature use, one made of expanded graphite is generally used. Unlike a rubber-made packing, this expanded-graphite-made packing material has a so-called non-self-sealing characteristic, which exerts sealability by being continuously given a pressing force. Thus, when the expanded-graphite-made packing material is used, a stepped packing insertion part is provided on a seat outer peripheral side, and the expanded-graphite-made packing material formed to have a rectangularly-shape in cross section is attached to this packing insertion part as being compressed and in a close contact state. With this packing material being pressed by the resilient force of the spring and the fluid pressure, sealability is retained.

As a ball valve of this type, a ball valve of PTL 1 is disclosed. In this ball valve, an annular ball seat is retained in an annular seat retainer, and an expanded-graphite-made packing material is attached in a close contact state between a gap provided between this seat retainer and a gland resiliently pressed by a spring.

Furthermore, in FIG. 5 of the literature, a tapered part is formed on a packing insertion part of the seat retainer to more improve a surface pressure force of the packing material. After the valve is assembled, the packing material is pressed by the resilient force of the spring and the fluid pressure to an insertion direction of the packing insertion part via the retainer gland, and is pressed to a sealing direction, that is, an outer periphery portion, by the packing insertion part provided by a tapered part to have a wedge shape.

On the other hand, in a ball valve of PTL 2, a sealing packing material is inserted between a valve body and a ring-shaped seat, and a wedge-shaped tapered part is formed on a depth side of the packing material of the ring-shaped seat, and a metal-made seal ring is inserted between this tapered part and the valve body and the packing material via a backup plate. The packing material is elastically deformed so as to increase its diameter to inner and outer diameter directions by pressure of an entering fluid and a pressing force by an elastic restoring force of a disc spring to seal between the ring-shaped seat and the valve body.

CITATION LIST

PTL 1: Japanese Patent Application Laid-Open Publication No. 2002-257246

PTL 2: Japanese Patent Application Laid-Open Publication No. 2011-122603

SUMMARY OF INVENTION

Technical Problem

As in PTL 1 and PTL 2, when an extended-graphite-made packing material is inserted in a close contact state into a gap between the seat retainer and the gland, if the seal surface pressure of this packing material is weak, there is a possibility that when a pressure by a high-pressure fluid is applied, this pressure cannot be sealed to cause leakage. To avoid this, it is required to adjust a compression amount of the packing material. In this case, if the compression amount is excessive, the spring is in a stated of being extended after assembling, possibly causing shortage of initial load and decreasing sealability. Moreover, this excessive compression may push the packing material off from the gap or may cause extreme deformation or crack to damage the packing material. On the other hand, if compression of the packing material is insufficient, an appropriate surface pressure cannot be caused on the attachment portion of this packing material, decreasing sealability and also excessively increasing close contact load between the ball valve body and the seat due to excessive shrinkage of the spring after assembling to excessively increase a binding force of the ball valve body by these seats on both sides to possibly increase operation torque.

When a high-temperature fluid flows, with the packing material attached to the gap in a close contact manner, this packing material tends to be pushed off to the outside or be deformed or cracked when thermally expanded by the high-temperature fluid.

To incorporate the packing material, it is required to compress and attach this packing material so as to fill in the gap between the seat and the gland and valve body, thereby degrading assembling capability. Moreover, when a tapered part is formed on the packing insertion part of the seat retainer, a dedicated jig may be required, thereby leading to more degradation in assembling capability. Still further, when the packing material is compressed, it is also required to adjust the compression amount for maintaining the followability of the packing material with respect to the movement of the seat when the valve is operated.

Packing materials have variation in dimension at the time of formation, and it may thus be required to finely control compression load for each packing material at the time of assembling. This can also serve as a factor of inhibiting assembling capability.

In the ball valve of the former PTL 1, the packing material is pushed to be deformed and inserted into the wedge-shaped packing insertion part, and a large insertion force is thus required. In particular, in the case of a large-diameter valve, incorporation is difficult, and the surface pressure may not be able to be exerted after assembling. And, to acquire most of the surface pressure force between the packing and the housing by this insertion force, an increase in seal surface pressure by using a spring and a fluid pressure is slight. Thus, it is difficult to sufficiently ensure a surface pressure required for sealing.

As for the ball valve of the latter PTL 2, when a pressurized fluid leaks from a contact part between the packing material and the valve body, this pressurized fluid is prevented by the metal-made seal ring from being leaked by a metal-made seal ring to a downstream side. However, with a structure in which the outer peripheral surface of the seal ring is caused to protrude from the gap, the wire diameter of this seal ring and the tapered part of the ring-shaped seat are required to be machined with high accuracy.

if these have variations in dimension, it is difficult to ensure sealability. There is also a problem of increasing the number of components because a seal ring and a backup plate are provided.

The present invention was developed to solve the conventional problems, and has an object of providing a trunnion-type ball valve, a valve seat structure, and a valve packing in which, in particular, a seal surface pressure of a tip outer peripheral region is improved to reliably prevent fluid leakage even at high pressures and high temperatures without attaching a packing between a ball seat and a body in a close contact state and the packing can be assembled as being in a predetermined mount state without requiring highly-accurate machining or compression amount adjustment.

Solution to Problem

To achieve the object described above, a first aspect of the invention is directed to a trunnion-type ball valve in which a ball provided inside a body is rotatably provided via upper and lower stems and is sealed with a ball seat to be contacted in a state of being pressed to the ball, the trunnion-type ball valve having a packing attached to a space between an outer periphery step part provided at a rear part of the ball seat or a rear part of a seat retainer to which the ball seat is attached and the body and a pressing mechanism by which this packing is pressed to a ball direction and being provided with a contact surface to make contact with a step part surface of the outer periphery step part on a tip outer diameter side of a tip surface of the packing and a non-contact part configuring a space provided between the packing and the step part surface of the outer periphery step part on a tip inner diameter side of the packing tip surface other than the contact surface and, in a state in which a torsional action is caused to act on the packing at least by a pressing force of the pressing mechanism, a tip outer peripheral region of the packing being locally press-contacted to raise a seal surface pressure.

Another aspect of the invention is directed to the trunnion-type ball valve in which the packing has a friction resistance on an inner peripheral side smaller than a friction resistance on an outer peripheral side and becomes in a state in which an inner diameter side advances more than an outer diameter side when the packing is pressed, and the torsional action occurs on the packing, with the contact surface as a fulcrum, to increase the seal surface pressure of the tip outer peripheral region serving as a point of load.

Another aspect of the invention is directed to the trunnion-type ball valve in which a non-contact part configuring the space is a tapered surface oriented to the tip inner diameter side of the packing, and this tapered surface is gradually brought into contact with the step part surface of the ball seat from an outer diameter side by the pressing force of the pressing mechanism and an auto-frettage force.

Another aspect of the invention is directed to the trunnion-type ball valve in which a non-contact part configuring a space is formed of a notched groove provided to the step part surface of the ball seat.

Another aspect of the invention is directed to the trunnion-type ball valve in which a rear end part of the packing is formed to have a concave substantially V shape in cross section, and the packing rear end part is sealed in a state of being pushed and spread to each of the ball seat side and the body side by pressing of the pressing mechanism.

Another aspect of the invention is directed to the trunnion-type ball valve in which the concave substantially V shape in cross section of the rear end part of the packing is provided to have a small angle, and the rear end part has a thickness provided to be substantially uniform to a tail end side.

Another aspect of the invention is directed to the trunnion-type ball valve in which inner and outer peripheral surfaces of the packing are formed as tilted surfaces tilted to an attachment direction of this packing, and a seal surface pressure of inner and outer periphery portions of the rear end part of the packing is raised in a state in which the rear end side of the packing on inner and outer peripheral sides protrude to either or both of the ball seat side and the body side.

Another aspect of the invention is directed to the trunnion-type ball valve in which the pressing mechanism has a spring and a retainer gland to be pressed by a resilient force of this spring, and an annular protruding part to which the packing is pressed is formed on a tip side of this retainer gland.

Another aspect of the invention is directed to the trunnion-type ball valve in which the packing is a molded packing having expanded graphite-made sheets laminated.

Another aspect of the invention is directed to a valve seal structure in which a seat in a pressed state is contacted with a valve body attached inside a body via a stem so as to be freely open and closed, the structure having a packing attached to a space between an outer periphery step part provided at a rear part of the seat or a rear part of a seat retainer to which the seat is attached and the body and a pressing mechanism by which this packing is pressed to a valve body direction and being provided with a contact surface to make contact with a step part surface of the outer periphery step part on a tip outer diameter side of the packing and a non-contact part configuring a space provided between the packing and the step part surface of the outer periphery step part on a tip inner diameter side of a packing tip surface other than the contact surface and, in a state in which a torsional action is caused to act on the packing at least by a pressing force of the pressing mechanism, a tip outer peripheral region of the packing being locally press-contacted to raise a seal surface pressure.

Another aspect of the invention is directed to the valve seal structure in which the packing has a friction resistance on an inner peripheral side smaller than a friction resistance on an outer peripheral side and becomes in a state in which an inner diameter side advances more than an outer diameter side when the packing is pressed, and sealing is made in a state in which a torsional action is caused to occur on the packing, with the contact surface as a fulcrum, to increase a surface pressure of the tip outer peripheral region serving as a point of load.

Another aspect of the invention is directed to a valve packing capable of sealing as being attached to a space between a rear part of a seat in a pressed state to be contacted with a valve body attached inside a body of a valve via a stem so as to be freely open and closed or an outer periphery step part provided at a rear part of a seat retainer to which a seat is attached and the body, wherein a contact surface to make contact with a step part surface of the outer periphery step part is provided on a tip outer diameter side of this packing, a non-contact part with the seat or the seat retainer is provided on a tip inner diameter side of a packing tip surface other than the contact surface and, in a state in which a torsional action is caused to act on the packing itself at least by a pressing force of a pressing mechanism, a tip outer peripheral region of the packing is a portion where a seal surface pressure is raised.

Another aspect of the invention is directed to the valve packing in which the non-contact part is a tapered surface oriented to the tip inner diameter side.

Another aspect of the invention is directed to the valve packing in which a rear end part is formed to have a concave substantially V shape in cross section, and this rear end part is provided to be capable of sealing in a state of being pushed and spread to each of the ball seat side and the body side.

Another aspect of the invention is directed to the valve packing in which the substantially V shape in cross section of the rear end part is provided to have a small angle, and the rear end part has a thickness provided to be substantially uniform to a tail end side.

Another aspect of the invention is directed to the valve packing in which inner and outer peripheral surfaces are formed as tilted surfaces tilted to an attachment direction, and either one or both of inner and outer peripheral sides of the rear end part protrude to raise a seal surface pressure between inner and outer periphery portions of the rear end part and the seat side and the body side.

Advantageous Effects of Invention

From the first aspect of the invention, the valve has the packing attached between the outer periphery step part and the body and the pressing mechanism by which this packing is pressed to the ball direction and is provided with a contact surface to be contacted with the step part surface on the tip outer diameter side of the packing and the space provided between the packing and the step part surface on the tip inner diameter side of the packing, and the seal surface pressure of the tip outer peripheral region of the packing is raised at least by the pressing force of the pressing mechanism. When a fluid flows, in particular, even in the case of a high-pressure fluid, a torsional action is caused to occur on the packing to locally and strongly press-contact the tip outer peripheral region to improve sealability without bringing the entire packing into close contact between the ball seat and the body, thereby allowing fluid leakage to be reliably prevented from low pressures to high pressures. Furthermore, with this torsional action, the auto-frettage force by fluid pressure can also be effectively applied to the tip outer peripheral region of the packing, and thus the seal surface pressure further rises. Without compressing the packing more than required, adjusting the compression amount, or requiring highly-accurate machining, the packing as a whole can also be easily assembled by being attached by a small insertion force to become in a predetermined state. When a high-temperature fluid flows, even when this high-temperature fluid causes the packing to thermally expand, the packing expands to the space side to eliminate possibilities of being pushed off to the outside, deformed, or cracked, and high sealability can be maintained.

From another aspect of the invention, the inner diameter side is caused to advance more than the outer diameter side of the packing, and the torsional action is caused to occur on the packing, with the contact surface as a fulcrum, so as to increase the surface pressure of the tip outer peripheral region to allow the packing to be inserted with a small force. The force in the pressing direction is increased by using the principle of leverage, and a portion of the tip outer peripheral region near the point of load is intensively press-contacted, thereby ensuring a surface pressure required for sealing.

From another aspect of the invention, a non-contact part configuring the space can be ensured by the tapered surface on the packing tip inner diameter side. Thus, when the pressing force is applied, this force can reliably raise the seal surface pressure of the packing tip outer peripheral region. Furthermore, with an increase of the fluid pressure, the contact area with the ball seat can be gradually increased from the tip outer peripheral side of the packing to ensure the seal surface pressure in accordance with the height of the fluid pressure, and leakage can be prevented also in a case of the high-pressure fluid.

From another aspect of the invention, it is not required to provide a contact surface or non-contact part at the tip side at the time of molding the packing or by machining after molding, thereby allowing the packing to be easily formed. Also in this case, as with the case in which a contact surface or non-contact part is formed on the packing, the seal surface pressure of the tip outer peripheral region of the packing is raised by the non-contact part configuring the space to allow prevention of leakage of the high-pressure fluid or high-temperature fluid. Entire assembling can be made while the packing is easily mounted without requiring highly-accurate machining or compression amount adjustment.

From another aspect of the invention, even when the fluid pressure is a low pressure, the ball seat side and the body side can be sealed with the rear end part of the packing by the pressing of the pressing mechanism. When the fluid pressure is a high pressure, in addition to the pressing of the pressing mechanism, by a so-called auto-frettage force using the fluid pressure, the packing is more strongly pressed to the ball seat to allow an improvement in seal ability.

From another aspect of the invention, a large compression margin can be ensured to a tail end side of the rear end part of the packing, and a deformation motion when this packing is pressed can be stabilized. This reduces variations in seal power near the rear end part for each packing and exerts a stable sealing function.

From another aspect of the invention, the packing rear end part is pressed by the ball seat and the body when the packing is attached to exert an elastic sealing force, thereby allowing an improvement in initial sealability of this rear end part and either or both of the ball seat side and the body side. Also when a low-pressure fluid flows, the ball seat side and the body side are sealed with the packing rear end part to prevent leakage.

From another aspect of the invention, the packing is pressed with the annular protruding part of the retainer gland via the resilient force of the spring. This pressing force raises each seal surface pressure between the packing and the ball seat and the body of the tip outer peripheral region to reliably prevent leakage. Furthermore, if the tip of the annular protruding part is formed to have a convex and substantially V shape in cross section, when the packing rear end part is provided to have a concave substantially V shape in cross section, this packing rear end part is pushed and spread to the ball seat side and the body side to allow sealability to rise. Here, the angle of the substantially V shape in cross section of the annular protruding part is provided to be smaller than that of the substantially V shape in cross section of the packing rear end part. Thus, the packing can be gradually brought into contact with the ball seat side and the body side from the tip side of the packing rear part to further improve the local seal surface pressure.

From another aspect of the invention, the packing is a molded packing having expanded-graphite-made sheets laminated. Thus, a large-diameter packing supporting the size of the seal surface can also be molded. Even when a high-temperature fluid flows, deformation and damage of the packing can be prevented to maintain high sealability.

From another aspect of the invention, application can be made to various valves. In particular, the invention exerts excellent functionality when a valve in a pressure seal structure of pressing the packing by using pressure. When the packing is attached, this packing can be attached as being twisted to improve sealability. When a fluid flows inside the valve, in particular, even in the case of a high-pressure fluid, a torsional action is caused to occur on the packing to locally and strongly press-contact the tip outer peripheral region to improve sealability without brining the entire packing into close contact between the seat and the body, thereby allowing fluid leakage to be reliably prevented from low pressures to high pressures. Furthermore, with this torsional action, the auto-frettage force by fluid pressure can also be effectively applied to the tip outer peripheral region of the packing, and thus the seal surface pressure further rises. Without compressing the packing more than required, adjusting the compression amount, or requiring highly-accurate machining, the packing as a whole can also be easily assembled by being attached by a small insertion force to become in a predetermined state. When a high-temperature fluid flows, the packing thermally expands to the space side to eliminate possibilities of being pushed off to the outside, deformed, or cracked, and high sealability can be maintained.

From another aspect of the invention, the inner diameter side is caused to advance more than the outer diameter side of the packing, and the torsional action is caused to occur on the packing, with the contact surface as a fulcrum, to increase the surface pressure of the tip outer peripheral region to allow this packing to be inserted with a small force.

The force in the pressing direction is increased by using the principle of leverage, and a portion of the tip outer peripheral region near the point of load is intensively press-contacted, thereby ensuring a surface pressure required for sealing.

From another aspect of the invention, the packing is attached to the valve as being twisted, thereby allowing sealability to rise. When a fluid flows, in particular, even in the case of a high-pressure fluid, a torsional action is caused to act without bringing the entirety into close contact inside the valve to raise the press-contact force of the tip outer peripheral region to allow an improvement in sealability. With this, even if a fluid from low pressures to high pressures flows inside the valve, fluid leakage can be reliably prevented. Furthermore, with this torsional action, the auto-frettage force by the fluid pressure can also be effectively raised to further improve the seal surface pressure, allowing attachment with a small insertion force.

From another aspect of the invention, a space can be configured on the tip inner diameter side via the tapered surface at the time of attachment inside the valve. When the pressing force is applied, the seal surface pressure of the tip outer peripheral region is reliably raised. Furthermore, with an increase in fluid pressure, the contact area is gradually increased from the tip outer peripheral side to ensure the seal surface pressure in accordance with height of the fluid pressure, and leakage can be prevented also in the case of a high-pressure fluid.

From another aspect of the invention, even when the fluid pressure is a low pressure, deformation of the rear end part allows sealing. When the fluid pressure is a high pressure, sealability can be improved by a so-called auto-frettage force using the fluid pressure.

From another aspect of the invention, a large compression margin can be ensured to a tail end side of the rear end part, and a deformation motion can be stabilized. This reduces variations in seal power near the rear end part and exerts a stable sealing function.

From another aspect of the invention, initial sealability can be improved. Also when a low-pressure fluid flows, high sealability of the rear end part reliably prevents leakage.

DESCRIPTION OF EMBODIMENTS

Figure 1:
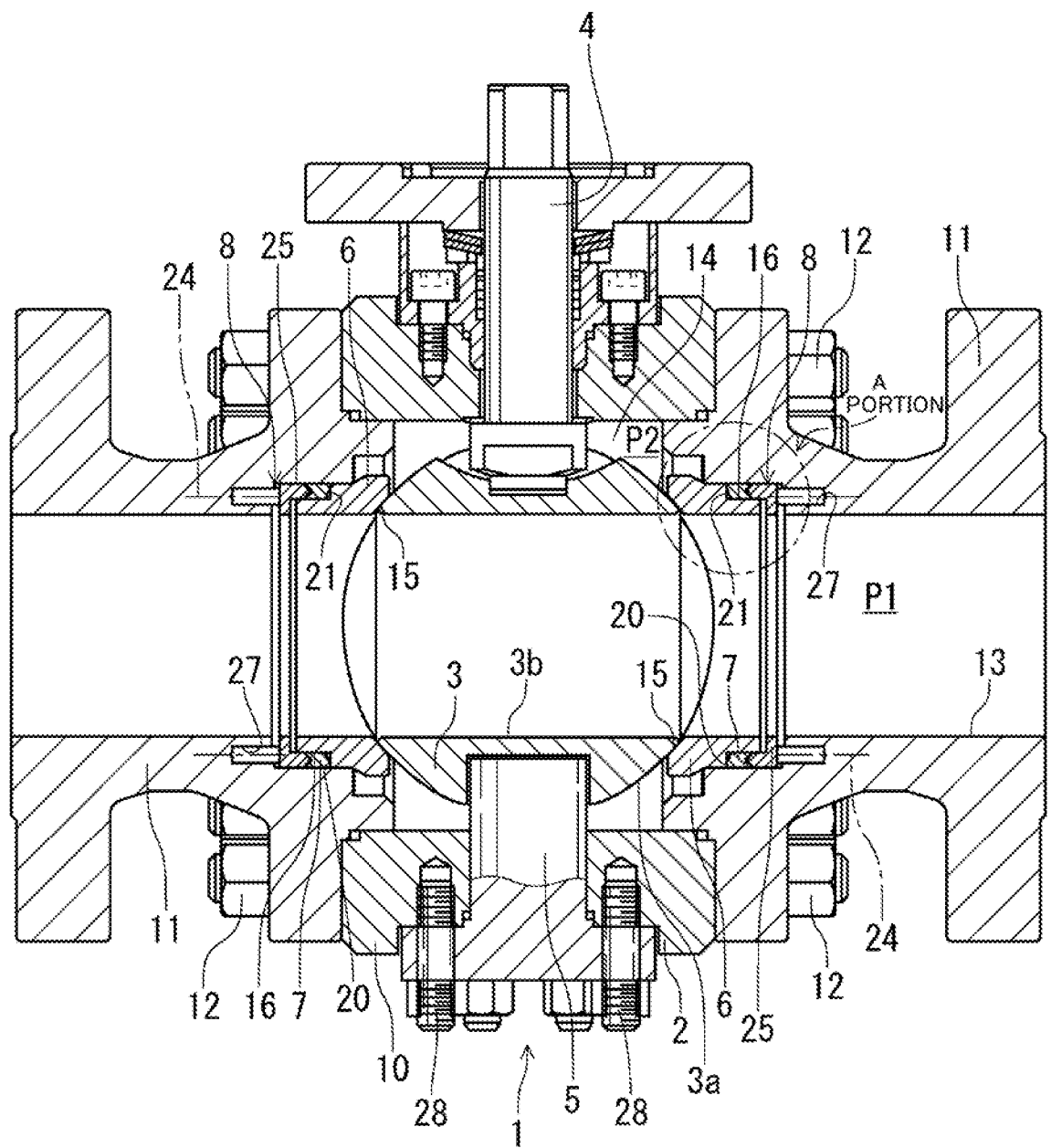
FIG. 1 is a longitudinal sectional view depicting a first embodiment of a trunnion-type ball valve of the present invention.

In the following, embodiments of the trunnion-type ball valve, valve seal structure, valve packing in the present invention are described based on the drawings. Depicted in FIG. 1 is a first embodiment of the trunnion-type ball valve of the present invention. Depicted in FIG. 2(a) is an enlarged sectional view of an A portion of FIG. 1.

The trunnion-type ball valve (hereinafter referred to as a valve main body 1) of FIG. 1 and FIG. 2(a) has a body 2, a ball 3, an upper stem 4, a lower stem 5, a ball seat 6, a packing main body 7, and a pressing mechanism 8 and, in particular, is suitable for use as a valve for high-pressure/high-temperature fluids. Specifically, the valve is suitable in a use range of, for example, maximum use pressures: 10-25 MPa and use temperatures: −40° C. to 535° C. The valve main body 1 of the present embodiment assumes a use pressure of 10 MPa and a use temperature of 400° C., and is configured with a nominal pressure of 600 pounds (10 MPa) and a size 12B. In the drawings, either of the right side and the left side of the valve main body 1 may be a primary side. In the present embodiment, it is assumed that the right side is a primary side (upstream side) and the left side is a secondary side (downstream side).

The body 2 has an annular body 10 and annular caps 11, 11 on both sides. These are provided by taking stainless steel, forged steel, or the like as a material, and are integrated by bolts/nuts 12. Inside the body 2, the ball 3 is rotatably provided via the upper stem 4 and the lower stem 5. On the upstream and downstream sides of this ball 3, the ball seat 6 is disposed. This ball seat 6 presses and makes contact with the ball 3 for sealing.

Note that the body 2 is not limited to have a three-piece structure as in the present embodiment but the structure may include a combination of a two-piece structure with a body and a cap, a bottom entry structure, a top entry structure, and so forth.

The ball 3 is formed of a stainless steel material, and is provided with a through hole 3*b* which can communicate with a flow passage 13 formed in the valve main body 1. Formed between the ball 3 and the body 2 is a cavity 14.

Figure 2:
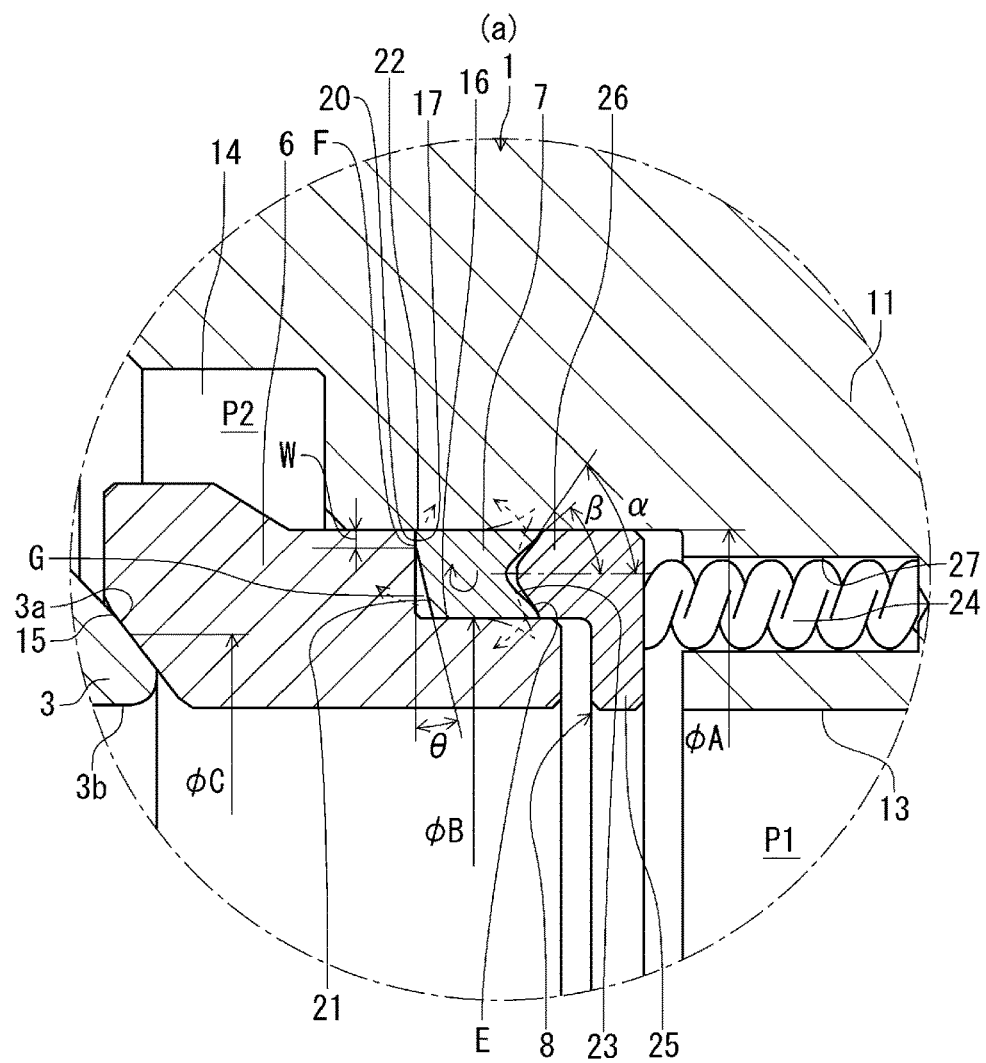
In FIG. 2, (a) is an enlarged sectional view of an A portion of FIG. 1, and (b) is an enlarged sectional view depicting a packing main body in (a).

In FIG. 2(*a*), the ball seat 6 is formed of a stainless steel material in a substantially cylindrical shape. Provided on a contact side to the ball 3 is an annular seal surface 15. This seal surface 15 is formed to have an R or tapered shape in cross section so as to be able to make a surface contact or line contact with the outer periphery of a ball surface 3*a* of the ball 3. Provided at a rear part of the ball seat 6 is an outer periphery step part 16. Formed on a side of the outer periphery step part 16 where the packing main body 7 is attached is a step part surface 17. Attached between the outer periphery step part 16 and the body 2 is the packing main body 7. Provided on a rear part side of this packing main body 7 is the pressing mechanism 8. By this pressing mechanism 8, the packing main body 7 is pressed to a ball direction.

The packing main body 7 depicted in FIG. 2(*b*) is provided by a molded packing with expanded-graphite-made sheets laminated coaxially with the ball seat 6. Provided on a tip outer diameter side of this packing main body 7 is a contact surface 20 to make contact with the step part surface 17 of the outer periphery step part 16 of the ball seat 6. Also in FIG. 2(*a*), provided on a tip inner diameter side of the packing main body 7 other than the contact surface 20 is a non-contact part 21. By this non-contact part 21, a space G is provided between the packing main body and the step part surface 17. A width W of the contact surface 20 in a radial direction is set on the order of 25% to 35% of the entire thickness of the packing main body 7 at the time of molding the packing main body 7.

The non-contact part 21 of the packing main body 7 of FIG. 2(*b*) is formed of a tapered surface oriented toward the tip inner diameter side of this packing main body 7. This tapered surface 21 is provided in a tapered shape so as to gradually make contact with the step part surface 17 of the ball seat 6 from an outer peripheral side by the pressing force of the pressing mechanism 8 and an auto-frettage force by fluid pressure. An angle θ of the tapered surface 21 from a vertical direction is desired to have a magnitude so as to maintain the shape of the entire packing main body 7 even at high pressures and, for example, this angle θ is desirably provided around 5°.

With the tapered surface 21 formed as described above, the packing main body 7 has an inner-peripheral-side length M formed shorter than an outer-peripheral-side length L in a pressing direction, and a friction resistance of this inner-peripheral-side length M is smaller than a friction resistance of the outer-peripheral-side length L.

In FIG. 2(*a*), the packing main body 7 is attached to the outer periphery step part 16 of the ball seat 6. After the attachment, a contact with the ball seat is avoided by the non-contact part 21. Formed between this non-contact part 21 and the ball seat 6 is a space G. The packing main body 7 is pressed by the pressing mechanism 8 to a ball seat 6 side. At least by this pressing force of the pressing mechanism 8, a seal surface pressure of a tip outer peripheral region 22 of the packing main body 7 to a body 2 side is raised. In this case, the non-contact part 21 is provided so as to be able to gradually make contact with the ball seat 6, with an increase of the pressing force of the packing main body 7.

With the packing main body 7 provided to have this shape, when this packing main body 7 is pressed to a ball seat 6 side, a rear end part 23 of this packing main body 7 exerts a function of a point of effort E, a contact side of the tip outer peripheral region 22 of the packing main body 7 to the ball seat 6 exerts a function of a fulcrum F, and a contact position of the tip outer peripheral region 22 of the packing main body 7 with the body 2 exerts a function of a point of load H.

When the pressing force is applied from the pressing mechanism 8 to the point of effort E, with the friction resistance on the inner peripheral side being smaller than the friction resistance on the outer peripheral side as described above, a state becomes such that the inner peripheral side advances more than the outer peripheral side of the packing main body 7 at the time of pressing. As indicated by an arrow of FIG. 2(*b*), a torsional action occurs on the packing, with the contact surface 20 as the fulcrum F. A force with which the tip inner diameter side of the packing main body 7 is pushed to the space G is transmitted so as to be converted to a force with which the tip outer peripheral region 22 of the packing main body 7 is pushed to the outer diameter direction. With this, the surface pressure of the tip outer peripheral region 22 serving as the point of load H onto the ball seat 6 increases to seal these.

In FIG. 2(*a*), the packing rear end part 23 is formed to have a concave substantially V shape in cross section tilted to each of an inner diameter side and an outer diameter side. With this rear end part 23 being pushed and spread by the pressing of the pressing mechanism 8 to each of a ball seat 6 side and a body 3 side, the packing rear end part 23 is provided so as to allow pressure contact sealing on these inner and outer peripheral sides. The rear end part 23 is provided to have a shape opening at an angle α from a horizontal direction on the order of, for example, 45°. The concave substantially V shape in cross section may have a shape with a concave shape in a trapezoidal shape or U shape as long as the shape is such that the inner diameter side and the outer diameter side of the rear end part 23 are pushed and spread to the ball seat 6 side and the body 3 side, respectively, by an annular protruding part 26 of a retainer gland 25, which will be described further below.

The pressing mechanism 8 has a spring 24 and the retainer gland 25 to be pressed by the resilient force of this spring 24.

The retainer gland 25 is formed in an annular shape, with its tip side formed with the annular protruding part 26. The retainer gland 25 is provided so as to be attachable at a position where the fluid inside the cap 11 acts, as being resiliently pressed from the spring 24 to the ball seat 6 side, and be able to press the packing main body 7 by the annular protruding part 26. The annular protruding part 26 has a tip formed in a substantially convex V shape in cross section, and is provided to have a shape opening at an angle β from the horizontal direction on the order of, for example, 40°. With this, when the packing rear end part 23 is pressed by this annular protruding part 26, the annular protruding part 26 can make contact with and gradually push and spread the rear end part 23 from the inner diameter side and the outer diameter side of the tip. The rear end part 23 is in close contact with the annular protruding part 26 of the retainer gland 25 on the inner diameter side and the outer diameter side.

The spring 24 is formed of a coil spring, is provided with elasticity which can exert a load with a fluid pressure on the order of 1 to 1.2 MPa, and is attached between each of a plurality of closed-end holes 27 formed in the cap 11 and the retainer gland 25. The spring 24 is preferably attached to each of the closed-end holes 27 equidistantly provided and, in this case, can press the retainer gland 25 to the packing main body 7 with an equal pressure.

Note that while the trunnion-type ball valve has been described as a target in the above embodiment, the embodiment can be applied also to various valves, for example, a gate valve, globe valve, and check valve. In this case, in particular, excellent functions can be exerted when the embodiment is used for a valve in a pressure seal structure in which a packing is pressed by using pressure.

That is, a valve seal structure in which a seat in a pressed state is contacted with a valve body attached inside a body via a stem so as to be freely open and closed can be applied to various valves. Specifically, it is possible to provide a valve seal structure having a packing attached between an outer periphery step part provided at a rear part of a seat and a body and a pressing mechanism by which this packing is pressed to a valve body direction and being provided with a contact surface to be contacted with a step part surface on a tip outer diameter side of the packing and a space provided between the packing and the step part surface on a tip inner diameter side of the packing. Here, a sealed state is in a state in which a seal surface pressure of the tip outer peripheral region of the packing is raised at least by a pressing force of the pressing mechanism.

Also, the trunnion-type ball valve may have a structure in which the ball is supported by a trunnion plate material. Furthermore, the embodiment may be applied to a floating-type ball valve using a retainer packing structure in which sealing is performed by an auto-frettage force by fluid pressure without using a pressing mechanism.

Furthermore, as with the above embodiment, the packing preferably has a length on the inner peripheral side formed shorter than the length on the outer peripheral side in a pressing direction, and the friction resistance on this inner peripheral side is preferably smaller than the friction resistance on the outer peripheral side. In this case, the state becomes such that the inner diameter side advances more than the outer diameter side when the packing is pressed. Sealing is enabled in a state in which a torsional action is caused to occur on the packing, with the contact surface as a fulcrum, to increase a surface pressure of the tip outer peripheral region serving as a point of load. As another means to decrease the friction resistance on the inner peripheral side, a material with low friction may be used on the inner peripheral side, for example, by changing surface roughness.

Also, the same goes for the packing. For any of various valves in a structure having a valve body attached inside a body via a stem so as to be freely open and closed, the packing can be used as a packing for use in this valve. In this case, the packing seals between the seat in contact in a pressed state and the body. The contact surface to the ball seat is provided on a tip outer diameter side, and a tip inner diameter side other than this contact surface serves as a non-contact part for the ball seat. Also, the tip outer peripheral region is a portion where the seal surface pressure rises.

Also, if the above-described packing main body 7 has the contact surface 20 and the non-contact part 21 on a tip side and the seal surface pressure of the tip outer peripheral region 22 of the packing main body 7 can be raised at least by the pressing force of the pressing mechanism 8, the packing main body 7 can be provided to have any of various shapes by, for example, changing the angle θ of the tapered surface 21, providing a predetermined angle to inner and outer peripheral surfaces, or forming a groove for diameter enlargement by notching the rear end part 23. The packing main body 7 may be formed by using a spring material made of stainless steel or the like or a soft material such as a copper alloy, or partially using a plastic material or, furthermore, in any case, may be configured by combining a plurality of divisional parts. In this case, the parts can be divided in either a flow passage direction or radial direction, while the entire elasticity is ensured.

Also, it is also possible to form a ball seat in a small annular shape, attach this ball seat to a cylindrically-formed metal-made seat retainer, and attach this seat retainer between the ball 3 and the packing main body 7. In this case, it is possible to seal between the seat retainer and the body 2 with the packing main body 7 in a manner similar to the above, and the ball seat can be provided by using a resin material such as PTFE (polytetrafluoroethylene).

Also, the spring 24 may be any other than a coil spring. For example, a disc spring or plate spring can also be used.

Next, the operation and action of the trunnion-type ball valve of the present invention in the above-described embodiment are described.

In FIG. 1 and FIG. 2, when the valve main body 1 is assembled, in a state in which the upper stem 4 is inserted from inside the body 2, the ball 3 is loaded inside the body 2, and a lower end of the upper stem 4 fits in an upper part of this ball 3. In this state, the lower stem 5 is inserted from below and outside the body 2, with its upper end fitting in a lower part of the ball 3, and the lower stem 5 is fastened with a bolt member 28 to be fixed to the body 2, thereby rotatably attaching the ball 3 with the upper and lower stems 4 and 5.

Subsequently, the caps 11, 11 are mounted on upstream and downstream sides of the body 2. First, the springs 24 are attached in the closed-end holds 27 of each cap 11, which is then covered from above with the retainer gland 25. With the substantially V shape in cross section of the rear end part 23 matching the annular protruding part 26 of this retainer gland 25, the packing main body 7 is attached to the inner peripheral side of the cap 11.

Next, for the cap 11 where with the above-described packing main body 7, retainer gland 25, and springs 24 are attached, with the packing main body 7 being positioned to the step part surface 17, the ball seat 6 fits in the cap 11. This allows the ball seat 6, the packing main body 7, the retainer gland 25, and the springs 24 to be temporarily attached to the cap 11. In this state, with the caps 11 fixedly attached to the upstream and downstream sides of the body 2 with the bolts/nuts 12, the valve main body 1 with the tip side of the ball seat 6 disposed at a predetermined position inside the body 2 can be assembled.

When a low-pressure fluid flows through the valve main body 1 of FIG. 1 after assembled, the retainer gland 25 of the pressing mechanism 8 is pressed by the resilient force of the springs 24, and the packing main body 7 is pressed by the retainer gland 25 to become in a state of being pressed to the ball seat 6. Here, as depicted in FIG. 2(*a*) and FIG. 2(*b*), the rear end part 23 of the packing main body 7 having the substantially V shape in cross section is locally pushed and spread by the annular protruding part 26 of the retainer gland 25 having the convex substantially V shape in cross section to inner and outer diameter directions indicated by two-dot-chain lines, thereby sealing each of the ball seat 6 and the cap 11.

On that occasion, the angle β of the annular protruding part 26 of the retainer gland 25 is smaller than the angle α of the rear end part 23, thereby decreasing an initial contact area to the packing main body 7 to cause a local surface pressure to adapt the retainer gland 25 and the packing main body 7 to each other to allow an improvement in sealing power of the rear end part 23. With the rear end part 23 having the substantially V shape in cross section, the ball seat 6 and the cap 11 can be sealed with the single packing main body 7.

On the tip side of the packing main body 7, formation of the tapered surface 21 as a non-contact part decreases the contact area of the contact surface 20 to the ball seal 6. Thus, a local surface pressure acts on this contact surface 20 by the resilient forces of the springs 24 to raise the seal surface pressure. In this manner, when a low-pressure fluid flows inside the valve main body 1, with the pressing force of the pressing mechanism 8, sealability can be ensured by improving each of the sealability between the contact surface 20 on the tip side of the packing main body 7 and the ball seat 6 and the sealability between the rear end part 23 and the ball seat 6 described above and the inner peripheral surface of the cap 11 inside the body 2.

In this case, the valve main body 1 can ensure the contact surface 20 having a certain area for each size of the valve main body 1 after assembled. This can ensure a certain seal surface pressure exerted by the pressing force of the pressing mechanism 8, and can ensure sealability by the contact surface 20 even if the fluid pressure is small, thereby inhibiting an excessive load.

When a high-pressure fluid flows inside the valve main body 1, a force to a direction of pushing the packing main body 7 out to the space G is applied to the point of effort E of the rear end part 23. Here, the inner diameter side of the packing main body 7 is in a state of being movable to the pushing-out direction with the space G, the inner-peripheral-side length M is formed shorter than the outer-peripheral-side length L to make the friction resistance on this inner peripheral side smaller than the friction resistance on the outer peripheral side, and the inner diameter side is in a state of advancing more than the outer diameter side when the packing main body 7 is pressed. Thus, also with the packing main body 7 being supported by the fulcrum F near the tip outer periphery, the packing main body 7 mainly on the inner diameter side advances to the pushing-out direction. This advance causes a torsional action as indicated by an arrow with the fulcrum F as a center. By using the so-called "principle of leverage", the force of the packing main body 7 in the pressing direction is increased, and the point of load H or the packing tip outer peripheral region 22 as an action surface is intensively (locally) brought into press-contact with the inner periphery of the cap 11 to increase the surface pressure, thereby allowing an improvement in sealability with the cap 11.

This torsional action of the packing main body 7 by "the principle of leverage" functions also at the time of assembling the valve main body 1, and sealability is ensured by increasing the surface pressure of the packing main body 7 by taking the tip outer peripheral region 22 as a center.

As the fluid pressure becomes a high pressure, the tapered surface 21 begins to make contact with the ball seat 6 from the outer diameter side to increase the seal width of this tapered surface 21, thereby increasing the contact surface 20. In this manner, with an increase of the contact surface 20 in accordance with the increase of the fluid pressure, sealability improves to reliably prevent leakage. The increase of the contact portion of the tapered surface 21 can avoid excessive local surface pressure, and can also prevent damage of the packing main body 7.

Furthermore, when a fluid flows inside the valve main body 1, a pressure P2 in a region of the cavity 14 surrounded by the packing main body 7 and the retainer gland 25 and a fluid pressure P1 inside the flow passage 13 cause a differential pressure. This differential pressure causes an auto-frettage force to the packing main body 7 in accordance with the fluid pressure P1 and the cavity pressure P2. Also by this auto-frettage force, the tapered surface 21 is pressed so as to gradually make contact with the ball. The auto-frettage force increases in accordance with an increase of the fluid pressure. With the magnitude of this auto-frettage force, the contact area increases as the contact surface 20 is adapted as being crushed, thereby stabilizing sealability.

In this case, in FIG. 2, when a packing outer diameter is $\phi A$, a packing inner diameter is $\phi B$, and a seal outer diameter of the packing main body 7 with the ball surface 3a is $\phi C$, an area S of the packing main body 7 where a fluid pressure is applied can be represented by the area $S=\pi/4\times$(packing outer diameter $\phi A$-packing inner diameter $\phi B^2$, and an auto-frettage force F acting on the packing main body 7 by the fluid pressure is represented by auto-frettage force F=pressure P1×area S. The area S does not change with the magnitude of the pressure, and thus even a low pressure can reliably cause an auto-frettage force, and favorable seal power can be acquired also at high pressures.

Note that in a state in which the valve main body 1 is fully closed, when the pressure P2 inside the cavity 14 exceeds the pressure P1 inside the flow passage 13, the packing main body 7 recedes oppositely to the ball 3 by the pressure P2, thereby causing the pressure P2 to enter a space between the step part surface 17 of the ball seat 6 and the tip of the packing main body 7. Then, on the ball seat 6, the pressure P2 inside the cavity 14 is applied to an area U formed of the packing inner diameter $\phi 3$ and the seal inner diameter $\phi C$ (area $U=\pi/4\times$(packing inner diameter $\phi B$-seal inner diameter $\phi C)^2$ to cause a force F2 (force F2=pressure P2×area U) which causes the ball seat 6 to recede oppositely to the ball 3. If this force F2 exceeds the sum of the resilient force of the springs 24 pressing the ball seat 6 to the ball 3 side and the auto-frettage force F by the fluid pressure, the ball seat 6 recedes oppositely to the ball 3, thereby causing a so-called pressure relief, in which the pressure P2 escapes to the flow passage 13, to function.

On the other hand, when a high-temperature fluid flows through the valve main body 1 and this high-pressure fluid causes the packing 7 to thermally expand, that expanded portion is deformed to the space G side, thereby preventing the packing from being pushed off to the outside of the valve main body 1 and also preventing the packing main body 7 from being deformed or cracked by undue compression. Thus, as with the case of the high-pressure fluid, sealability can be ensured by the pressing force of the pressing mechanism 8 and the auto-frettage force.

As described above, the contact surface 20 is provided on the tip outer diameter side of the packing main body 7, the non-contact part 21 is provided on the tip inner diameter side other than the contact surface 20, and the seal surface pressure of the tip outer peripheral region 22 of the packing main body 7 is raised at least by the pressing force of the pressing mechanism 8. Thus, with the pressing force of the pressing mechanism 8 acting at the time of low pressures and the auto-frettage force in addition to this pressing force of the pressing mechanism 8 acting at the time of high pressures, sealing can be made stably from low pressures to high pressures. Furthermore, a load in accordance with the fluid pressure is caused to occur prevent an abnormal torque increase, thereby also allowing stable operability to be maintained.

When the packing main body 7 is incorporated, it is not required to cram this packing main body 7 between the ball seat 6 and the retainer gland 25 and the body 2 as being compressed. This eliminates the need of performing initial compression, and the assembling capability is excellent. Furthermore, the area S where a differential pressure is caused to occur can be increased without requiring a dedicated jig, thereby allowing an improvement in sealability by auto-frettage force. The followability of the packing main body 7 with respect to the movement of the ball seat 6 at the time of valve actuation is improved, and the sealing power and durability are also excellent.

With the packing main body 7 formed of one sheet of material and its rear end part 23 provided to have a substantially V shape in cross section, a space between the ball seat 6 to which this packing main body 7 is attached and the retainer gland 25 has a margin, and a long seal length of the packing main body 7 in the flow passage direction can be ensured even in a limited narrow space to improve sealability. The packing main body 7 is disposed inside the valve main body 1 in a compact manner, thereby being able to support also valves having a small diameter and a small intra-surface at a low class.

Figure 3:
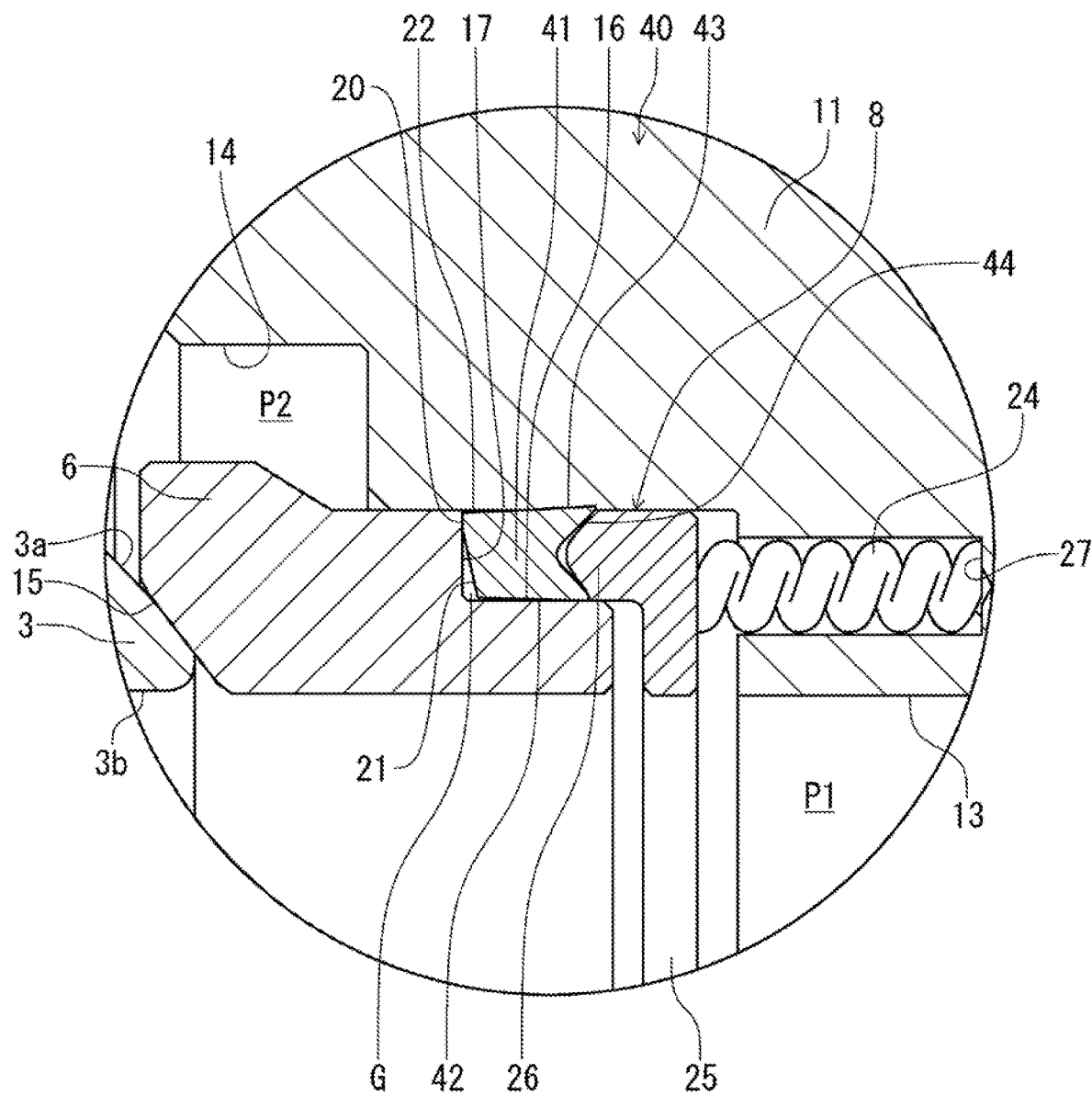
FIG. 3 is an enlarged longitudinal sectional view of main parts depicting a second embodiment of the trunnion-type ball valve of the present invention.

In FIG. 3, a second embodiment of the trunnion-type ball valve of the present invention is depicted. Note in this embodiment onward that a portion identical to that of the above-described embodiment is represented by the same reference character and description of that portion is omitted.

In a valve main body 40 of this embodiment, an inner peripheral surface 42 and an outer peripheral surface 43 of a packing 41 are formed as tilted surfaces tilted to a direction in which this packing 41 is attached. In a state in which inner and outer peripheral sides of a packing rear end part 44 protrude to either or both of the ball seat 6 side and the body 2 side, the seal surface pressures of the inner and outer periphery portions of this rear end part 44 are raised.

With this, at the time of insertion of the packing 41, the rear end part 44 is warped to ensure ease of assembling. Also, by using a large-diameter valve which tends to have a large clearance (for example, a valve on the order of size 10B) in consideration of a process tolerance and expansion under high temperatures, it is possible to compensate for shortage of initial sealability, that is, seal power at the time of occurrence of a seal surface pressure mainly including the pressing force of the pressing mechanism 8. With that elastic force, sealability on the outer and inner peripheral sides of the packing 41 can be improved.

Figure 4:
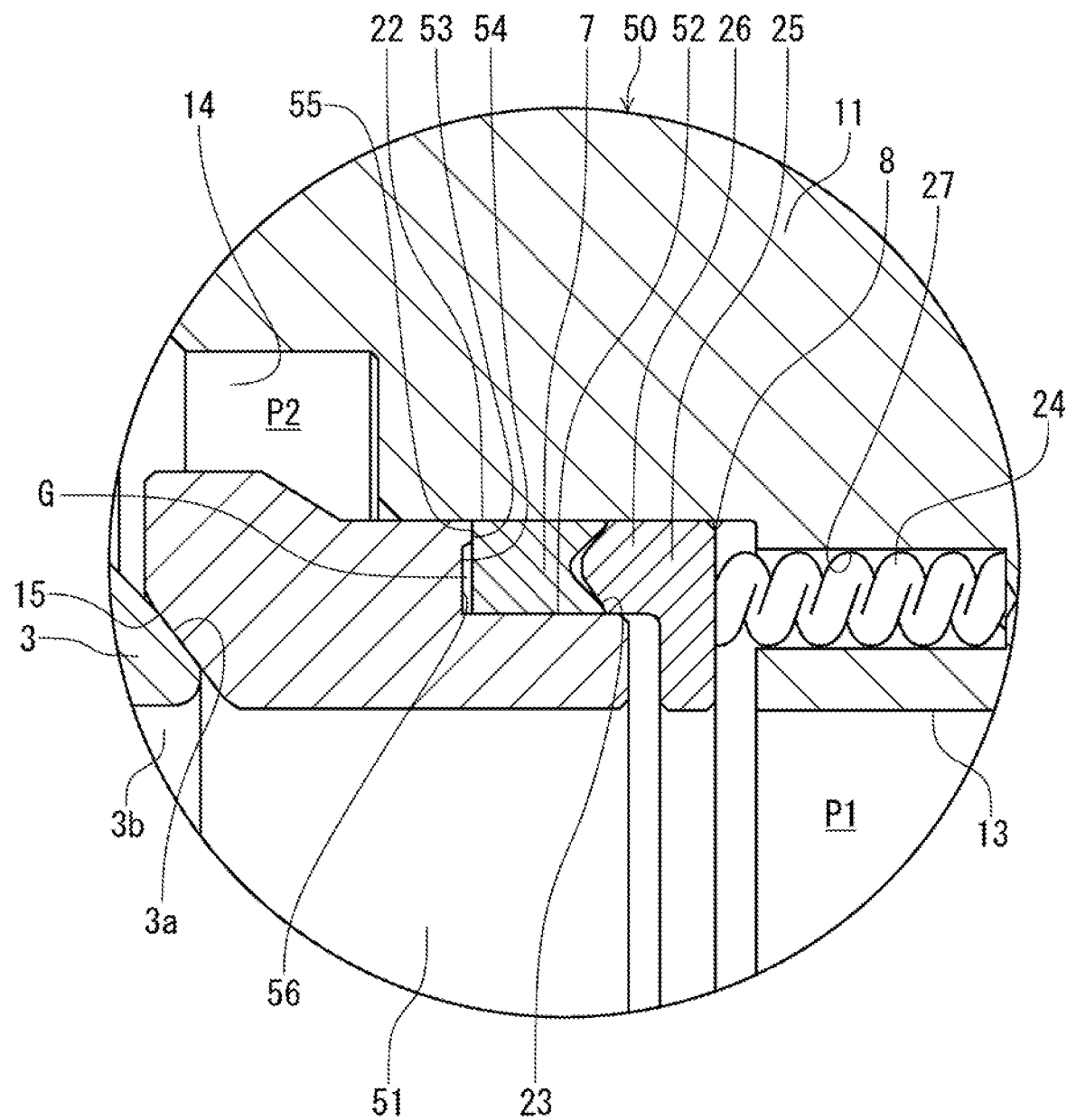
FIG. 4 is an enlarged longitudinal sectional view of main parts depicting a third embodiment of the trunnion-type ball valve of the present invention.

In FIG. 4, a third embodiment of the trunnion-type ball valve of the present invention is depicted. In a valve main body 50 of this embodiment, a notched groove 54 having a predetermined depth is formed in a step part surface 53 of an outer periphery step part 52 of a ball seat 51, and this notched groove 54 is provided as a non-contact part 56.

With this, without providing a tapered surface to the packing main body 7, a tip outer diameter side of this packing main body 7 is a contact surface 55 to the ball seat 51, and a space G can be provided between a tip inner diameter side and the step part surface 53, thereby allowing effects similar to those of the above embodiment to be exerted.

Figure 5:
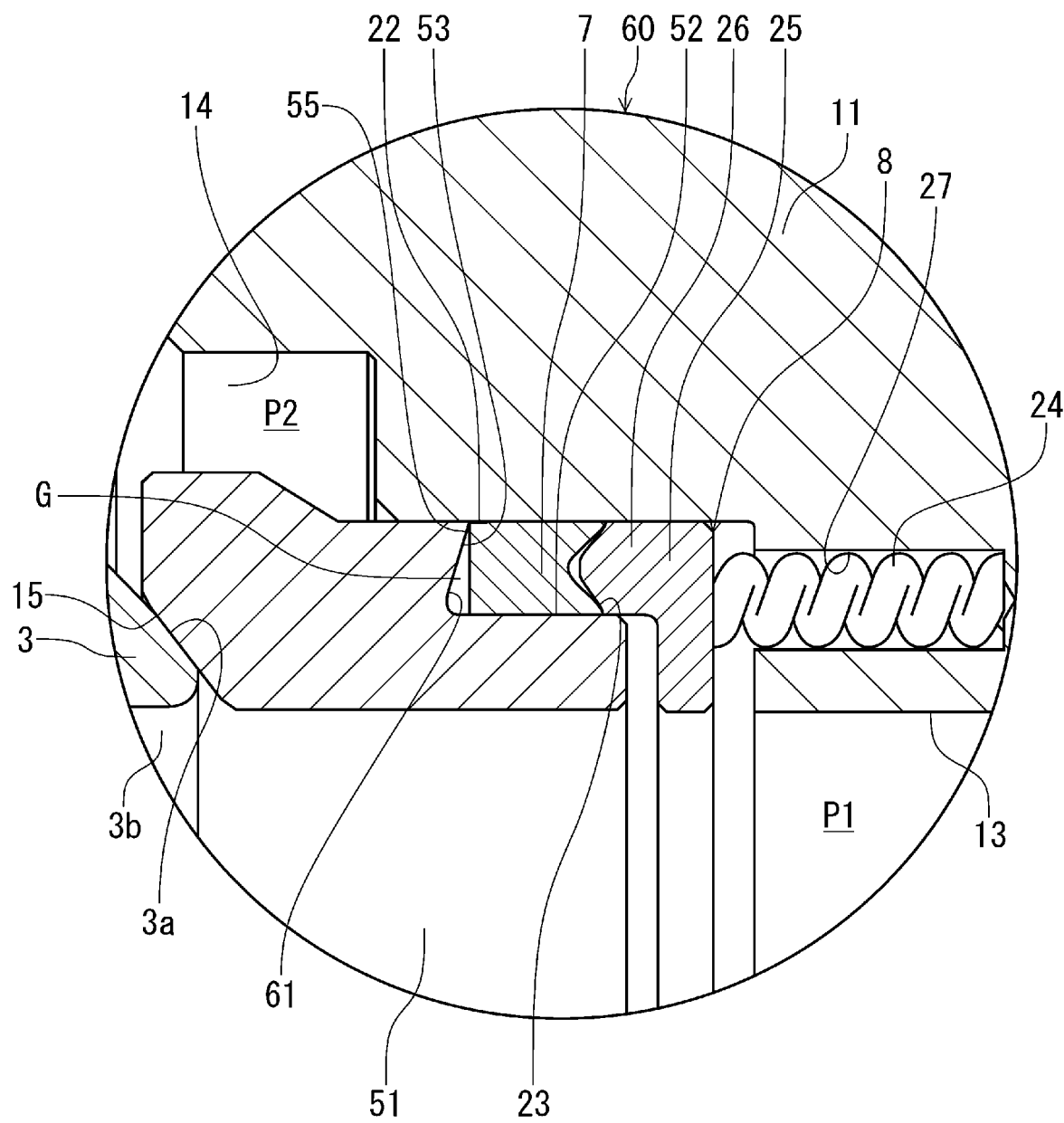
FIG. 5 is an enlarged longitudinal sectional view of main parts depicting a fourth embodiment of the trunnion-type ball valve of the present invention.

In FIG. 5, a fourth embodiment of the trunnion-type ball valve of the present invention is depicted. In a valve main body 60 of this embodiment, a tapered surface 61 is provided to the step part surface 53 of the ball seat 51, and this tapered surface 61 is taken as a non-contact part. In this case, as with the valve main body 50 of FIG. 4, without providing a tapered surface to the tip of the packing main body 7, a tip outer diameter side of this packing main body 7 is taken as the contact surface 55 to the ball seat 51, and the space G is provided between a tip inner diameter side of the packing main body 7 and the tapered surface 61. With this space G, effects similar to those of the above embodiment are exerted. As long as the tapered surface 61 is in a state of non-contact with the tip of the packing main body 7, this tapered surface 61 can be provided at any angle.

Figure 6:
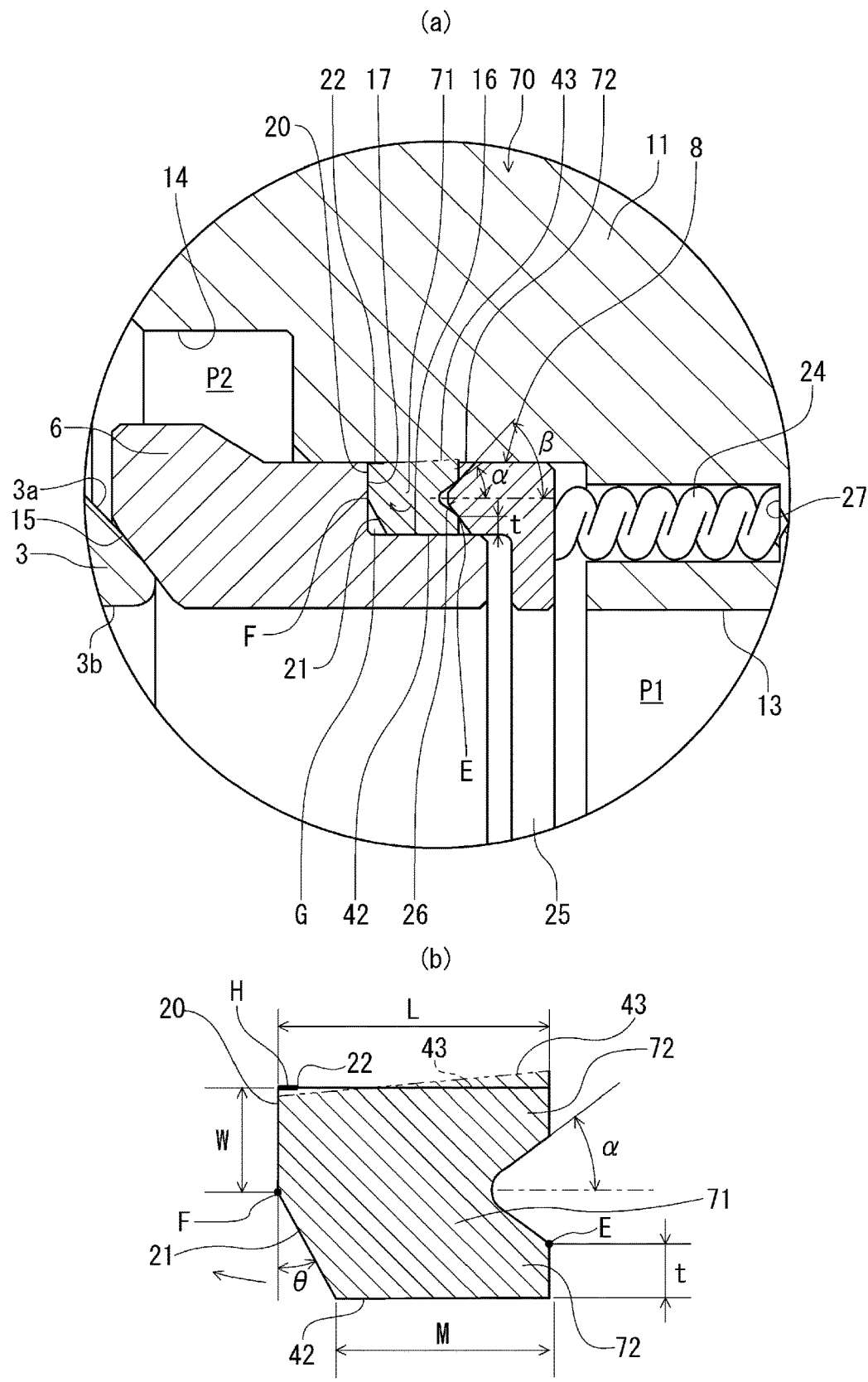
In FIG. 6, (a) is an enlarged longitudinal sectional view of main parts depicting a fifth embodiment of the trunnion-type ball valve of the present invention, and (b) is an enlarged sectional view depicting a packing main body in (a).

In FIG. 6, a fifth embodiment of the trunnion-type ball valve of the present invention is depicted. In a valve main body 70 of this embodiment, only the outer peripheral surface 43 of a packing main body 71 is a tilted surface, and the inner peripheral surface 42 is formed of a straight flat surface parallel to the outer periphery step part 16. The width W of the contact surface 20 in the radial direction is provided to be equal to or smaller than 50% of the thickness of the packing main body 71 at the time of molding, and an angle θ of the tapered surface 21 from a vertical direction is provided on the order of 30° to 40°. Also, in the retainer gland 25, a tip angle β of the annular protruding part 26 is provided to be on the order of, for example, 27.5°, in an open shape.

When the valve main body 70 is assembled, the springs 24 and the retainer gland 25 are incorporated into the cap 11. When the packing main body 71 is attached to this from above, that outer peripheral surface 43 is entirely deformed along the inner periphery of the cap 11 as being twisted, and its deformed portion bulges as a tilted surface to the inner peripheral surface 43 of the packing main body 71. Here, with the shape of the above packing main body 71, the tilted angle occurring on the inner peripheral side of the cap 11 can be reduced by an angle provided in advance to the outer peripheral surface 43 side.

Thus, when the ball seat 6 is loaded to the inner periphery of the packing main body 71 from the rear end side, insertion is facilitated by reducing an increase in seal surface pressure on the inner peripheral side of the packing rear end part 72 and, furthermore, integral incorporation can be made in a state in which the surface pressure force of the inner and outer peripheries of this rear end part 72 is ensured.

With this structure, even if the valve main body 70 is a large-diameter valve, the packing main body 71 and the ball seat 6 can be easily incorporated. Even if the process tolerance of the packing main body 71 is large due to the large diameter, integration can be made while the seal surface pressure on the outer peripheral side and the inner peripheral side is ensured via deformation of the packing main body 71 at the time of attachment. Thus, for example, even if the packing main body 71 is provided by press molding of expanded graphite, sealability of the outer peripheral side, which tends to become in a rough state, can also be ensured. Furthermore, with only the outer peripheral surface 43 being a tilted surface, the packing main body 71 can be easily molded.

Furthermore, an angle α of a substantially V shape in cross section of the rear end part 72 is provided at an angle α=30° smaller than the angle α=45° of FIG. 2(a). With this, compared with the case of FIG. 2(a), a thickness t of the rear end part 72 is provided to be substantially uniform to a tail end side at least on the inner peripheral side, allowing reduction in variations in dimension of the rear end part 72 for each packing main body 71. Thus, while flexibility of the rear end part 72 is maintained to ensure ease of assembling, the thickness of this rear end part 72 as a whole is thickened to the tail end side to increase a compression margin by the retainer gland 25 and absorb the process tolerance and the formation tolerance to stabilize a deformation motion of the rear end part 72.

After assembling, the angle α of the substantially V shape in cross section of the rear end part 72 is further shrunk. Thus, the pressing forces to the inner peripheral surface of the cap 11 and the outer periphery step part 16 are each reinforced to improve seal ability.

The fulcrum F in the drawing is set at a substantially center position in the radial direction of the cross section of the packing main body 71. With this, the width W of the contact surface 20 of the packing main body 71 in the radial direction is set on the order of 50% of the thickness of the packing main body 71. Thus, the area of the contact surface 20 is widened. When this contact surface 20 makes contact with the step part surface 17, an error of the contact area for each packing main body 71 is decreased. Even in the case of the valve main body 70 having a large diameter, the entire deformation motion is stabilized when the pressing force is applied to the packing main body 71 to cause a torsional action to an arrow direction in FIG. 6(*b*).

In this case, if the point of effort E is on the inner diameter side of the fulcrum F, the fulcrum F can be set at any position, and the tapered surface 21 can be set to have a desired angle θ based on the position of this fulcrum F. With this, for example, by setting a large angle θ while the fulcrum F is on the outer diameter side, a difference between the outer-peripheral-side length L of the packing main body 71 and the inner-peripheral-side length M thereof can be increased, a difference between the friction resistances on the inner and outer peripheral sides when the pressing force is applied from the pressing mechanism 8 can be widened, and the pressing force to the outer diameter direction of the packing tip outer peripheral region 22 by the torsional action can be raised to further improve sealability.

Here, with the space G being also widened, even if a high-pressure fluid flows and the pressing force to make the packing main body 71 excessive, the non-contact part 21 is left, thereby reliably maintaining the torsional action with the fulcrum F as a center and, with the torsional force by the differential pressure being left, allowing a strong seal surface pressure to be caused to occur at the tip outer peripheral region 22 as the point of load H.

While the embodiments of the present invention have been described in detail, the present invention is not limited to the description of the above embodiments, and can be variously modified in a range not deviating from the spirit of the invention described in claims in the present invention.

REFERENCE SIGNS LIST 1 valve main body
2 body
3 ball
4 upper stem
5 lower stem
6 ball seat
7 packing main body
8 pressing mechanism
16 outer peripheral step part
17 step part surface
20 contact surface
21 tapered surface (non-contact part)
22 tip outer peripheral region (point of load)
23 packing rear end part
24 spring
25 retainer gland
26 annular protruding part
42, 43 tilted surface
54 notched groove (non-contact part)
F fulcrum
G space

The invention claimed is:

1. A trunnion-type ball valve comprising:
a body;
a ball provided rotatably inside the body via upper and lower stems;
a ball seat pressed into contact with the ball to form a seal;
a packing disposed between an outer periphery step part provided at a rear part of the ball seat and the body; and
a pressing mechanism including a spring and a retainer gland pressed by a resilient force of the spring,
the packing being provided with a contact surface contacting a step part surface of the outer periphery step part, the contact surface being on a tip outer diameter side of a tip surface of the packing, and
the packing being provided with a non-contact part, and a space is defined between the non-contact part and the step part surface of the outer periphery step part.
the non-contact part being on a tip inner diameter side of the tip surface of the packing, and
the tip surface of the packing including the contact surface and the non-contact part of the packing,
wherein, when a rear end part of the packing is pressed by the retainer gland, an inner diameter side of the packing advances into the space more than an outer diameter side of the packing, and a torsional action occurs between the inner diameter side and the outer diameter side of the packing with:
an inner diameter side of the rear end part of the packing functioning as a point of effort:
the contact surface of the packing functioning as a fulcrum; and
a tip outer peripheral region of the packing functioning as a point of load.

2. The trunnion-type ball valve according to claim 1, wherein the packing has a friction resistance on an inner peripheral side smaller than a friction resistance on an outer peripheral side, such that when the packing is pressed, an inner diameter side of the packing advances more than an outer diameter side of the packing and the torsional action occurs on the packing, with the contact surface functioning as a fulcrum, to increase the seal surface pressure of the tip outer peripheral region serving as a point of load.

3. The trunnion-type ball valve according to claim 1, wherein a non-contact part defining the space is a tapered surface oriented to face the tip inner diameter side of the packing, and the tapered surface is gradually brought into contact with the step part surface of the ball seat from an outer diameter side by the pressing force of the pressing mechanism and a force caused by fluid pressure.

4. The trunnion-type ball valve according to claim 1, wherein a non-contact part defining the space is formed of a notched groove provided in the step part surface of the ball seat.

5. The trunnion-type ball valve according to claim 1, wherein the retainer gland has an annular protruding part pressed against the rear end part of the packing, and the annular protruding part is formed on a tip side of the retainer gland.

6. The trunnion-type ball valve according to claim 1, wherein the packing is a molded packing having laminated expanded-graphite-made sheets.

7. The trunnion-type ball valve according to claim 1, wherein a rear end part of the packing is formed to have a concave, substantially V-shaped cross section, and the packing rear end part is sealed in a state of being pushed and spread to each of a ball seat side and a body side by pressing of the pressing mechanism.

8. The trunnion-type ball valve according to claim 7, wherein the concave,. substantially V-shaped, cross section of the rear end part of the packing is provided so as to form an angle, and the rear end part has a thickness provided to be substantially uniform to a tail end side.

9. The trunnion-type ball valve according to claim 7, wherein inner and outer peripheral surfaces of the packing are formed as tilted surfaces tilted relative to an axial direction of the packing, and a seal surface pressure of inner and outer peripheral portions of the rear end part of the packing is raised in a state in which a rear end side of the packing on inner and outer peripheral sides protrude to either or both of the ball seat side and the body side.

10. A valve seal structure comprising:
a seat adapted to contact, in a pressed state, a valve body attached inside a body via a stem so as to be freely opened and closed:
a packing disposed between an outer periphery step part provided at a rear part of the seat and the body; and
a pressing mechanism by which the packing is pressed towards a valve body, the pressing mechanism including a spring and a retainer gland pressed by a resilient force of the spring,
the packing being provided with a contact surface for making contact with a step part surface of the outer periphery step part on a tip outer diameter side of the packing, and a non-contact part defining a space between the packing and the step part surface of the outer periphery step part on a tip inner diameter side of a packing tip surface other than the contact surface, and
wherein, when a rear end part of the packing is pressed by the retainer gland, an inner diameter side of the packing advances into the space further than an outer diameter side of the packing, and a torsional action occurs between the inner diameter side and the outer diameter side of the packing with:
an inner diameter side of the rear end part of the packing functioning as a point of effort:
the contact surface of the packing functioning as a fulcrum; and
a tip outer peripheral region of the packing functioning as a point of load.

11. The valve seal structure according to claim 10, wherein the packing has a friction resistance on an inner peripheral side smaller than a friction resistance on an outer peripheral side, when the packing is pressed, an inner diameter side of the packing advances more than an outer diameter side of the packing and sealing is made in a state in which a torsional action is caused to occur on the packing, with the contact surface functioning as a fulcrum, to increase a surface pressure of the tip outer peripheral region serving as a point of load.

12. A valve packing capable of sealing when attached to a space between a rear part of a seat in a pressed state to be contacted with a valve body attached inside a body of a valve via a stem so as to be freely opened and closed and the body, the valve packing comprising:
a contact surface for making contact with a step part surface of an outer periphery step part of the seat is provided on a tip outer diameter side of the packing; and
a non-contact part that does not make contact with the seat is provided on a tip inner diameter side of a packing tip surface other than the contact surface.
wherein, when a rear end part of the packing is pressed by a pressing force of a pressing mechanism, an inner diameter side of the packing will advance in a direction toward the seat more than an outer diameter side of the packing, and a torsional action occurs between the inner diameter side and the outer diameter side of the packing with:
an inner diameter side of the rear end part of the packing functioning as a point of effort:
the contact surface of the packing functioning as a fulcrum; and
a tip outer peripheral region of the packing functioning as a point of load.

13. The valve packing according to claim 12, wherein the non-contact part is a tapered surface that is tapered toward the tip inner diameter side.

14. The valve packing according to claim 12, wherein inner and outer peripheral surfaces are formed as tilted surfaces that are tilted in an axial direction of the packing, and one or both of the inner and outer peripheral sides of the rear end part protrude so as to raise a seal surface pressure between inner and outer peripheral portions of a rear end part and seat side and a body side.

* * * * *